J. SHALLER.
STEP FOR VELOCIPEDE.

No. 192,022. Patented June 12, 1877.

Witnesses:
Otto Aufeland.
James W. Wright, Jr.

Inventor
John Shaller
by
Van Santvoord & Hauff
his attorneys

UNITED STATES PATENT OFFICE.

JOHN SHALLER, OF NEW YORK, N. Y.

IMPROVEMENT IN STEPS FOR VELOCIPEDES.

Specification forming part of Letters Patent No. 192,022, dated June 12, 1877; application filed May 10, 1877.

*To all whom it may concern:*

Be it known that I, JOHN SHALLER, of the city, county, and State of New York, have invented a new and Improved Step for Velocipedes, which invention is fully set forth in the following specification, reference being had to the accompanying drawing, in which—

Figure 1:
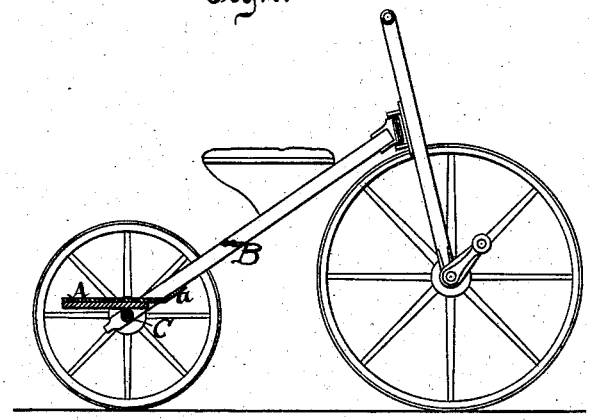
Figure 2:
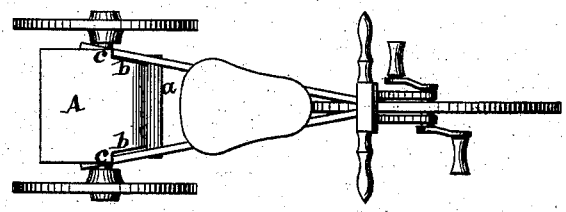
Figure 3:
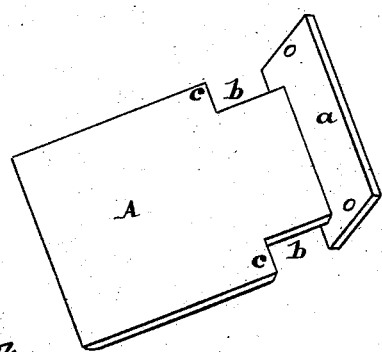

Figure 1 represents a longitudinal section of a velocipede provided with my step. Fig. 2 is a plan or top view of the same. Fig. 3 is a perspective view of the step, detached, on a larger scale than the previous figures.

Similar letters indicate corresponding parts.

This invention consists of a step adapted to be applied to the rear axle and the hounds of a three-wheeled velocipede, it being provided at the front edge with an inclined retaining-flange, and with recesses between the ends of said flange, and between supporting-shoulders, so that by means of said flange, supporting shoulders, and recesses the step can be readily and conveniently adjusted and secured in the required position on any velocipede with two wheels behind and one in front, and thereby a convenient support is obtained for a child to stand behind the rider who occupies the seat of the velocipede.

In the drawing, the letter A designates my step, which is provided with an inclined retaining-flange, *a*, two recesses, *b*, and two supporting-shoulders, *c*. The flange *a* is secured to the front edge of the step, and its ends project beyond the sides of the recesses *b*, so that the same can be made to catch behind the hounds B of a three-wheeled velocipede, while the shoulders *c* bear upon the outer surfaces of said hounds, and the body of the step rests upon the axle C. (See Figs. 1 and 2.) In the ends of the flange *a* are holes for the passage of screws, by means of which my step can be readily secured to the hounds B.

When the step has been thus adjusted in position it forms a convenient support for a child standing behind the rider who occupies the seat, while it does not interfere with the operation of the velocipede.

My step can be furnished at a very low price, and it can be readily attached to all three-wheeled velocipedes having two wheels behind and one in front. In velocipedes of this class, as now constructed, children are frequently tempted to stand on the rear axle behind the rider, their feet being supported simply by the rear axle, so that their position is uncomfortable, and also to some extent dangerous, since the feet are liable to slip off from their narrow support. My step prevents any slipping, and it forms a convenient support for the feet.

What I claim as new, and desire to secure by Letters Patent, is—

A step for a three-wheeled velocipede, provided with an inclined retaining-flange, *a*, two recesses, *b*, and two supporting-shoulders, *c*, all as shown and described.

In testimony that I claim the foregoing I have hereunto set my hand and seal this 1st day of May, 1877.

JOHN SHALLER. [L. S.]

Witnesses:
W. HAUFF,
E. F. KASTENHUBER.